US009183690B2

(12) United States Patent
Schneider et al.

(10) Patent No.: US 9,183,690 B2
(45) Date of Patent: Nov. 10, 2015

(54) METHOD AND ADMINISTRATION SYSTEM FOR MONITORING OF DISPOSAL PROCESSES FOR MONEY

(75) Inventors: Gerhard Schneider, Offenbach (DE); Christoph Oemig, Kronberg im Taunus (DE); Frank Lenzner, Altenstadt (DE)

(73) Assignee: Wincor Nixdorf International GmbH, Paderborn (DE)

( * ) Notice: Subject to any disclaimer, the term of this patent is extended or adjusted under 35 U.S.C. 154(b) by 1020 days.

(21) Appl. No.: 12/989,752

(22) PCT Filed: May 7, 2009

(86) PCT No.: PCT/EP2009/055531
§ 371 (c)(1),
(2), (4) Date: Jan. 6, 2011

(87) PCT Pub. No.: WO2009/138355
PCT Pub. Date: Nov. 19, 2009

(65) Prior Publication Data
US 2011/0131117 A1 Jun. 2, 2011

(30) Foreign Application Priority Data

May 13, 2008 (DE) .......................... 10 2008 023 244

(51) Int. Cl.
*G06Q 10/00* (2012.01)
*G07D 11/00* (2006.01)
*G06Q 40/00* (2012.01)

(52) U.S. Cl.
CPC ............ *G07D 11/0066* (2013.01); *G06Q 40/12* (2013.12)

(58) Field of Classification Search
USPC ......................................................... 705/30
See application file for complete search history.

(56) References Cited

U.S. PATENT DOCUMENTS 4,188,962 A * 2/1980 Onoe et al. .......................... 221/7
5,930,771 A * 7/1999 Stapp ............................... 705/28
(Continued)

FOREIGN PATENT DOCUMENTS

DE 10050486 4/2002
DE 10360861 8/2005
(Continued)

OTHER PUBLICATIONS

Translation of International Preliminary Report on Patentability for PCT/EP2009/055531 (Dec. 16, 2010).
(Continued)

*Primary Examiner* — Ryan Zeender
*Assistant Examiner* — Milena Rancic
(74) *Attorney, Agent, or Firm* — Harness, Dickey & Pierce, P.L.C.

(57) ABSTRACT

A method and an administration system (CCMS) are proposed for monitoring of disposal processes for funds (GM) which are accepted by at least one money acceptance system (CP) and which are removed from the monetary cycle, wherein inventory data (B1, B2) about the disposed funds (GM) are detected. The administration system (CCMS) has a first data interface (IF1) in order to receive first inventory data (B1) from the at least one money acceptance system (CP) and has a second data interface disposal device (WTU) which disposes of the funds (GM) from the monetary cycle. In addition, the administration system (CCMS) has at least one computing unit which compares the first and the second inventory data (B1, B2) with each other, and depending on this comparison, generates results data (R) for at least one device (BK) which administers the ownership of the funds (GM).

7 Claims, 2 Drawing Sheets

(56) References Cited

U.S. PATENT DOCUMENTS

| | | | |
|---|---|---|---|
| 6,264,020 B1* | 7/2001 | Rufener et al. | 194/350 |
| 6,655,584 B1 | 12/2003 | Lundblad | |
| 7,500,568 B2* | 3/2009 | Cousin | 209/534 |
| 7,533,800 B2* | 5/2009 | Tripp et al. | 235/379 |
| 8,225,988 B1* | 7/2012 | Bohen et al. | 235/379 |
| 2001/0054643 A1 | 12/2001 | Siemens | |
| 2003/0120569 A1 | 6/2003 | Lundblad | |
| 2004/0049442 A1* | 3/2004 | Lundblad | 705/35 |
| 2006/0271643 A1* | 11/2006 | Stallman | 709/217 |
| 2007/0063016 A1* | 3/2007 | Myatt et al. | 235/379 |
| 2008/0120232 A1* | 5/2008 | Herrin et al. | 705/42 |

FOREIGN PATENT DOCUMENTS

| | | |
|---|---|---|
| DE | 10 2005 049064 A | 4/2007 |
| EP | 1123540 | 8/2001 |
| EP | 1490843 | 12/2004 |
| EP | 1564692 | 8/2005 |
| EP | 1564692 A | 8/2005 |
| WO | 99-27388 | 6/1999 |
| WO | 03-083787 | 10/2003 |
| WO | 2007042308 | 4/2007 |
| WO | 2008031115 | 3/2008 |
| WO | WO-2008/031115 A | 3/2008 |

OTHER PUBLICATIONS

First Office Action from State Intellectual Property Office in related Chinese Patent Application No. 200980117124.5, dated Sep. 6, 2012.

* cited by examiner

METHOD AND ADMINISTRATION SYSTEM FOR MONITORING OF DISPOSAL PROCESSES FOR MONEY

CROSS-REFERENCE TO RELATED APPLICATIONS

This application is a National Stage of International Application No. PCT/EP2009/055531, filed May 7, 2009. This application claims the benefit and priority of German application 10 2008 023 244.0, filed May 13, 2008. The entire disclosures of the above applications are incorporated herein by reference.

BACKGROUND

This section provides background information related to the present disclosure which is not necessarily prior art.

1. Technical Field

The invention relates to a method for the monitoring of disposal processes for money and to an administration system for carrying out the method.

2. Discussion

The invention relates in particular to a method and an administration system for the monitoring of disposal processes for money that is accepted by at least one money acceptance system and is removed from the monetary cycle, wherein inventory data about the disposed money are detected. All types of systems and installations are understood here as money acceptance systems (also described as "cash points") that accept money (bank notes, coins) from the monetary cycle, such as cash registers or automated teller machines with a deposit function, etc. It is particularly important when disposing of money to monitor the process seamlessly and to ensure that no money is lost.

The normal procedure when disposing of money or of entire money acceptance systems that still contain money is as follows:

The money to be disposed of is removed from the money acceptance system or cash point (cash register, automated teller machine with deposit function) by a valuables transport company and counted manually or with the aid of counting devices. The valuables transport company thus occupies the function of a disposal device for the money. The inventory data identified from the counting are then transmitted to an institution that administers ownership of the money. Said institution is normally a bank, but can also be the accounting department of a department store chain or similar. The inventory data are then compared at this institution with any inventory data determined by the money acceptance system itself through an internal counter to determine whether differences or missing amounts exist. The institution (e.g. bank) then sets about clarifying the differences. These processes are still largely carried out manually. Technical devices or systems would be desirable for automated, in particular fully automated, monitoring and processing of such disposal processes. Under this heading comes automated generation whenever possible of accounting data in particular for credit notes for the amount of the money disposed of.

SUMMARY OF THE INVENTION

It is, therefore, an object of the present invention to overcome advantageously the problems of the prior art identified above. In particular, a technically realizable solution for monitoring disposal processes for money shall be provided.

Accordingly, a method is proposed in which first inventory data from the at least one money acceptance system are transmitted over a first data interface to a central administration system; in which second inventory data from a disposal device that removes money from the monetary cycle are transmitted over a second data interface to the central administration system; and in which the first and second inventory data are compared with each other by the administration system and, depending on the comparison, results data are generated to be prepared for at least one institution that administers ownership of the money.

To carry out the method, an administration system is proposed that has a first data interface to receive first inventory data from the at least one money acceptance system; that has a second data interface to receive second inventory data from a disposal device that removes the money from the monetary cycle; and that has at least one computing unit that compares the first and second inventory data with each other and, depending on the comparison, generates results data to prepare them for at least one institution that administers ownership of the money.

The invention makes feasible highly efficient processing of disposal processes wherein a computer-controlled administration system and interfaces for data transmission, with cash points, valuables transport systems and banks, is provided, and central data collection and evaluation and results generation is achieved.

In accordance with the method, the first inventory data are preferably generated by a first counting device provided in the money acceptance system that counts the money to be disposed of before it is handed over to the disposal institution and/or the second inventory data are generated by a second counting device provided in the disposal device that counts the money to be disposed of after it is received from the money acceptance system.

The inventory data are preferably sent from the particular counting device to the administration system. Provision can also be made for the administration system to query the inventory data from the particular counting device, particularly when the first inventory data have already been sent from the first counting device but the second inventory data have not yet been sent from the second counting device after a predetermined time period has expired.

In order to generate the results data, any discrepancy occurring when comparing the first and second results data is preferably taken into account. In order to clarify differences that result through the bank in particular, each discrepancy appearing in the results data when comparing the first and second inventory data is indicated by the administration system. Provision can also be made for the administration system, when clarifying differences, to indicate only such discrepancies appearing in the results data the amount of which exceeds a predetermined threshold when comparing the first and second inventory data.

The results data can involve not only the type of data for clarifying differences that are produced automatically in the form of lists of differences and are prepared for the bank. They can also be the type of data that are required for an entry of the actual money removed and are generated in particular as accounting data records for the bank. The accounting data records represent credit notes that are entered in favor of the particular bank at the disposing institution, in particular at a central bank (e.g. the Federal Bank).

The results data are preferably converted in a conversion device into results data for the particular bank having a predetermined data format, specifically an accounting format for credit notes, and sent to the bank, that is, to the institution administering ownership of the money, through a third data interface.

The administration system in accordance with the invention makes feasible electronic and automated monitoring of disposal processes for money to be disposed of and can exchange data directly with money acceptance systems (cash points) and disposal devices. To this end, the administration system has available a first data interface to receive first inventory data from the at least one money acceptance system and a second data interface to receive second inventory data from a disposal device that removes the money from the monetary cycle. The administration system has at least one computing unit that compares the first and second inventory data with each other and, depending on the comparison, generates results data in order to prepare said data for at least one institution, such as a bank, that administers ownership of the money.

The administration system preferably has still a third data interface in order to transmit the results data to the institution that administers ownership of the money. A conversion device can also be provided that is connected to the administration system, or is integrated therein, and that converts the results data into results data with a predetermined data format, specifically accounting data format for credit notes, and transmits said data to the institution administering ownership of the money over the third data interface.

BRIEF DESCRIPTION OF THE DRAWINGS

The invention is described hereinafter in more detail using one embodiment, with reference to the attached drawings.

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

Figure 1:
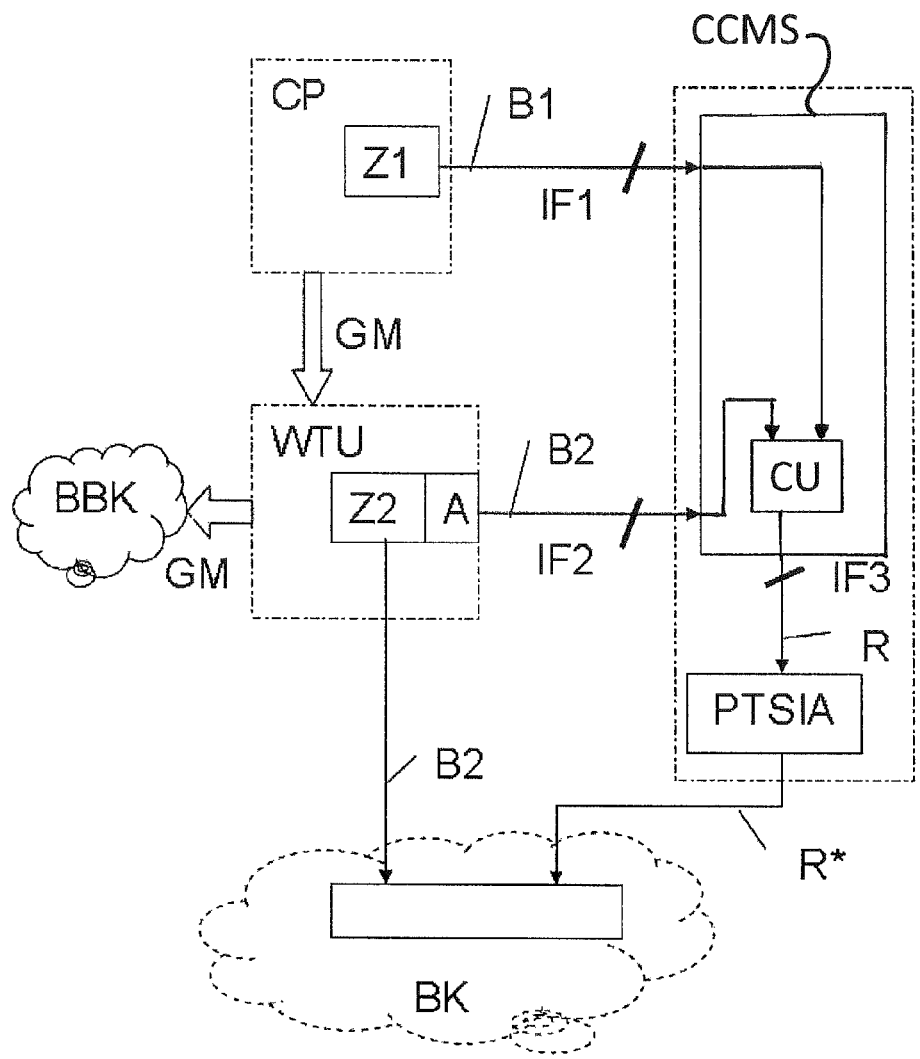
FIG. 1 shows the schematic structure of a system in accordance with the invention.

The system shown in FIG. 1 comprises an administration system CCMS that monitors the disposal processes for money GM that is accepted by at least one money acceptance system CP and in particular is removed from the monetary cycle. Disposal here also means that severely worn money is ,removed at least temporarily from cash dispensers and taken for recycling for re-use in cash dispensers and similar.

As an example for many cash dispenser systems, a cash dispenser CP is shown here in FIG. 1 that includes a deposit function. The money to be disposed of GM is removed from the cash dispenser CP by a disposal device, represented here as an example by a valuables transport company WTU, and after being counted out, is transported further, for example to a central bank BBK, for disposal there. In addition, the valuables transport company WTU reports corresponding inventory data B2 to an institution, in this case to the responsible bank BK, that administers ownership of the money.

In accordance with the invention, the administration system CCMS has a data interface IF2 over which it is connected to the disposal device, that is to say the valuables transport company WTU, and which automatically receives or can retrieve inventory data B2 acquired there, for example, over a counting device Z2. In addition, the administration CCMS also has a data interface IF1 to the particular money acceptance system, or cash dispenser CP, in order to receive automatically inventory data B1 acquired therefrom or to retrieve such data as are collected by a counting device Z1 there. The data interfaces IF1 and IF2 can be designed as different or identical, preferably standardized, data interfaces, such as V.90 or DSL for example. The cash dispenser CP or the counting device Z1 integrated therein automatically sends the first inventory data B1 over the first data interface, for example in XML or CSV format, to the administration system CCMS. The disposal device WTU, or the counting device Z2 integrated therein, automatically sends the second inventory data B2 over the second data interface to the administration system CCMS. The second data interface IF2 can be designed as a web-based data interface in order to render feasible, for example, automated or manual entry and transmission of the inventory data B2 from an Internet connection. An adapter A can also be connected to the counting device Z2 or be integrated therein that converts the inventory data B2 for transmission into a specific, if necessary proprietary, format and sends said data to the administration system CCMS.

The inventory data B1 and B2 are preferably sent automatically from the particular counting device Z1 or Z2 to the administration CCMS. Provision can also be made for the administration system CCMS to retrieve the inventory data from the particular counting device, in particular when the first inventory data B1 have already been sent from the first counting device Z1 but the second inventory data B2 have not yet been sent from the second counting device Z2 after a predetermined period has expired. It is also conceivable that the administration system CCMS sends an instruction or alarm message to the device WTU and/or the bank.

The administration system CCMS in accordance with the invention makes feasible electronic and automated monitoring of disposal processes for the money GM to be disposed of and can exchange data directly with money acceptance systems CP and disposal devices WTU. To do this, the administration system CCMS has a first data interface IF1 to receive the first inventory data B1 from the particular money acceptance system CP and a second data interface IF2 to receive the second inventory data B2 from the particular disposal device WTU that removes money from the monetary cycle. The administration system CCMS has at least one computing unit (not shown) that compares the first and second inventory data B1 and B2 and, depending on the comparison, generates results data R to prepare them for at least one institution, such as the bank BK that administers ownership of the money GM.

The administration system CCMS shown here has a third data interface IF3 in order to send the results data to the bank BK. For this purpose, a conversion device PTSIA is provided that is connected to the administration system CCMS, preferably integrated therein, and which converts the results data into results data R* with a predetermined data format, in particular accounting data format for credit notes, and then sends them over the third data interface IF3 to the bank BK. The results data are thus put into a format suitable for the bank BK that can conform to the SWIFT or DTA standard.

The results data R, or R*, generated also serve to identify differences occurring in the disposal of the money GM and to send said differences to the bank BK, or to prepare them for said bank for retrieval in the administration system CCMS.

Figure 2:
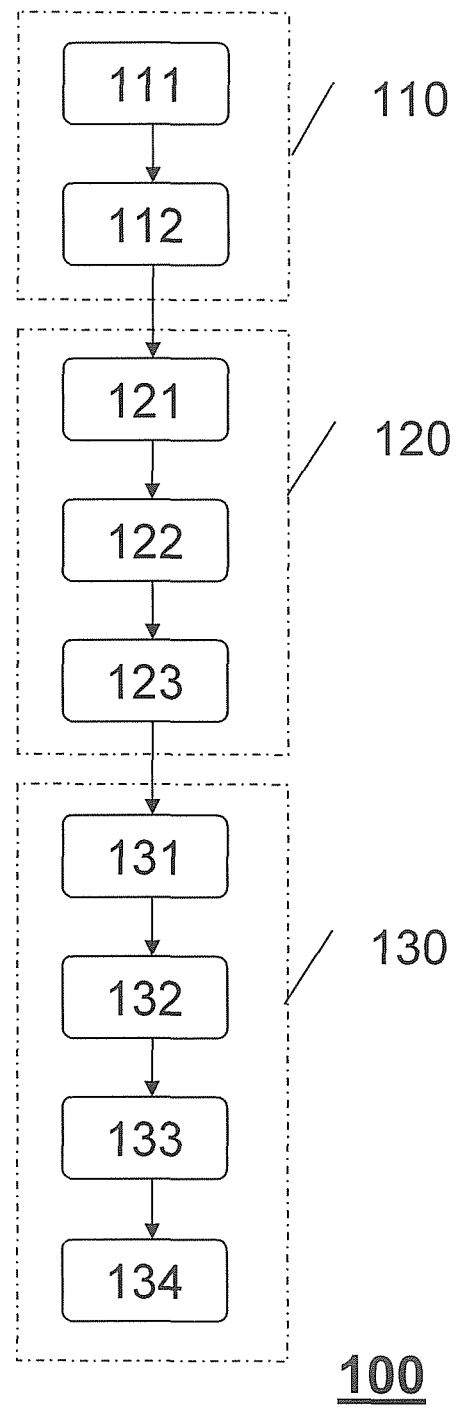
FIG. 2 shows a flow chart for a method in accordance with the invention.

The administration system CCMS is installed in a computing center, for example and assumes the function of a central, computer-controlled service provider system and operates as follows under the method in accordance with the invention, where one embodiment is described as an example using FIG. 2:

The method 100 comprises, for example, the sections 110, 120 and 130 of the method that refer to data acquisition and transmission with respect to the first, second and/or third data interface, IF1, IF2 or IF3 and in each case comprise individual (sub-)steps.

The method 100 begins here with step 111 in which, before the removal of the money GM, first inventory data B1 are collected in the cash dispenser CP by the counting device Z1 there, which are then transmitted in step 112 over data interface IF1 to the administration system CCMS.

In step 121, after the physical removal of the money GM from the cash dispenser CP, the second inventory data B2 are generated by counting the money in the valuables transport company WTU that has at its disposal a further counting device Z2. Then, in step 122, the second inventory data B2 are transmitted to the administration system CCMS, this time, however, over the second data interface IF2. Additionally, these inventory data B2 can be optionally reported to the central BBK to which the money GM is also physically transferred.

In step 131, the administration system CCMS now collects the first and second inventory data B1 and B2 and compares them with each other to identify any differences. Based on this comparison, information (e.g. lists of differences) is generated in step 132 for the results data R that are preferably converted in a further step 133 into data R* with a suitable data format that is optimized for later data processing by the bank responsible in each case.

Finally, the results data R* are sent in step 134 over the third data interface IF3 to the bank BK or its computing center.

The method and administration system in accordance with the invention make feasible electronic and automated monitoring of disposal processes for money to be disposed of, wherein the necessary inventory data can be received directly by money acceptance systems (cash points) and disposal devices (WTUs) over data interfaces. The data can then be evaluated automatically and centrally in order to generate results data for the institution in question or bank and keep said data in readiness or to transmit said data directly over a further data interface.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed:

1. A method for monitoring transport of money from a money acceptance system as the money is removed from circulation comprising:
   electronically transmitting first inventory data from the at least one money acceptance system over a first data interface to a remote central administration system;
   electronically transmitting second inventory data from a disposal device that removes the money from circulation over a second data interface to the remote central administration system, the disposal device is separate from the money acceptance system; and
   comparing the first and second inventory data with the remote central administration system and, depending on the comparison, generating results data for at least one institution that administers ownership of the money:
   wherein the first inventory data includes a first count of the money when the money is at the money acceptance system, and the second inventory data includes a second count of the money when the money is at the disposal device;
   wherein the first inventory data is generated by a first counting device provided in the money acceptance system that counts the money to be removed from circulation before the money is transferred to the disposal device;
   wherein the second inventory data is generated by a second counting device provided in the disposal device that counts the money to be removed from circulation after receiving said money from the money acceptance system;
   wherein the first inventory data is sent from the money acceptance system to the remote central administration system, and the second inventory data is sent from the disposal device to the remote central administration system;
   wherein the remote central administration system queries the second inventory data from the second counting device of the disposal device when the first inventory data has previously been sent from the first counting device to the remote central administration system, but the second inventory data has not been sent from the second counting device to the remote central administration system after expiration of a predetermined time; and
   wherein the remote central administration system converts the results data in a conversion device into results data with a predetermined data format, including accounting data for credit notes and sends said data to the institution administering ownership of the money over a third data interface.

2. The method from claim 1, wherein the administration system, when the first inventory data has already been sent by the first counting device, but the second inventory data has not yet been sent from the second counting device after a predetermined time period has expired, sends a warning message about the lack of reception of the second inventory data to the disposal device and/or to the institution that administers ownership of the money.

3. The method from claim 1, wherein the administration takes into account any discrepancy occurring when comparing the first and second inventory data to generate the results data.

4. The method from claim 3, wherein to clarify differences each discrepancy occurring in the comparison of the first and second inventory data is indicated in the results data.

5. The method from claim 3, wherein, in order to clarify differences, only such discrepancies or deviations occurring in the results data in the comparison of the first and second inventory data are indicated which exceeds a predetermined threshold.

6. An administration system for monitoring disposal processes for money that is accepted by at least one remote money acceptance system and removed from circulation, wherein inventory data about the money removed is collected, comprising:

a first data interface of the administration system that is configured to electronically receive first inventory data from the at least one remote money acceptance system;

a second data interface of the administration system that is configured to electronically receive second inventory data from a remote disposal device that removes money from circulation; and at least one computing unit of the administration system configured to compare the first and the second inventory data with each other and, depending on the comparison, generate results data in order to prepare said data for at least one institution that administers ownership of the money;

wherein the first inventory data includes a first count of the money when the money is at the money acceptance system, and the second inventory data includes a second count of the money when the money is at the disposal device;

wherein the first inventory data is generated by a first counting device provided in the money acceptance system that counts the money to be removed from circulation before the money is handed over to the disposal device;

wherein the second inventory data is generated by a second counting device provided in the disposal device that counts the money to be removed from circulation after receiving said money from the money acceptance system;

wherein the first inventory data is sent from the money acceptance system to the administration system, and the second inventory data is sent from the disposal device to the administration system;

wherein the administration system queries the second inventory data from the second counting device of the disposal device when the first inventory data has previously been sent from the first counting device to the administration system, but the second inventory data has not been sent from the second counting device to the administration system after expiration of a predetermined time;

wherein the administration system has a third data interface in order to send the results data to the institution that administers ownership of the money; and wherein a conversion device is connected to the administration system, or is integrated therein, that converts the results data into results data with a predetermined data format, including accounting data format for credit notes and sends said data to the institution administering ownership of the money over the third data interface.

7. A method for monitoring transport of a bundle of money comprising:

counting the bundle at a cash dispenser with a first counting device to generate first count data;

electronically transferring the first count data to a remote central administration system using a first data interface;

transferring the bundle from the cash dispenser to a disposal device;

counting the bundle at the disposal device with a second counting device to generate second count data;

electronically transferring the second count data to the remote central administration system using a second data interface, the remote central administration system queries the second count data from the second counting device when the first count data has been transferred to the remote central administration system but the second count data has not been received by the remote central administration system after a predetermined period of time;

comparing the first count data and the second count data using the remote central administration system to generate results data, the results data indicating that money has been removed from the bundle during transport if the second count data is lower than the first count data; and transferring the results data to a banking institution where transport of the bundle can be monitored;

wherein the remote central administration system converts the results data in a conversion device into results data with a predetermined data format, including accounting data for credit notes and sends said data to the institution administering ownership of the money over a third data interface.

* * * * *